(12) United States Patent
Usui et al.

(10) Patent No.: US 9,184,856 B2
(45) Date of Patent: Nov. 10, 2015

(54) DETECTING WIRELESS NOISE WITHIN TIME PERIOD IN WHICH NO DATA IS PURPOSEFULLY WIRELESSLY COMMUNICATED

(75) Inventors: Hideyuki Usui, Kanagawa-ken (JP);
Hideyuki Tagai, Kanagawa-ken (JP);
Osamu Yamamoto, Kanagawa-ken (JP);
Kohji Inoue, Kanagawa-ken (JP);
Kazuo Fujii, Kanagawa-ken (JP);
Kohhei Shibata, Kanagawa-ken (JP)

(73) Assignee: Lenovo Enterprise Solutions (Singapore) PTE. LTD., Singapore (SG)

( * ) Notice: Subject to any disclaimer, the term of this patent is extended or adjusted under 35 U.S.C. 154(b) by 2373 days.

(21) Appl. No.: 11/043,235

(22) Filed: Jan. 26, 2005

(65) Prior Publication Data
US 2006/0166622 A1 Jul. 27, 2006

(51) Int. Cl.
*H04B 1/00* (2006.01)
*H04B 15/00* (2006.01)
*H04B 15/02* (2006.01)
*H04W 16/14* (2009.01)

(52) U.S. Cl.
CPC ............... *H04B 15/02* (2013.01); *H04W 16/14* (2013.01); *H04B 2215/064* (2013.01)

(58) Field of Classification Search
USPC ............................ 455/550.1, 566, 310, 63.1
See application file for complete search history.

(56) References Cited

U.S. PATENT DOCUMENTS 4,626,789 A * 12/1986 Nakata et al. ................. 329/311
5,726,678 A * 3/1998 Dingwall ....................... 345/100
5,748,752 A * 5/1998 Reames ........................ 381/94.1
6,381,476 B1 * 4/2002 Yoshida ........................ 455/566

(Continued)

FOREIGN PATENT DOCUMENTS

JP 04-281622 10/1992
JP 07-015390 1/1995

(Continued)

OTHER PUBLICATIONS

Anders Lindgren et al., Evaluation of Quality of Service Schemes for IEEE 802.11 Wireless LANs, Proceedings of the 26th Annual IEEE Conference on Local Computer Networks, year 2001, pp. 348 et seq.

(Continued)

*Primary Examiner* — Ankur Jain
(74) *Attorney, Agent, or Firm* — Charlie Bustamante

(57) ABSTRACT

Wireless noise is detected within a time period specifically held after a data packet is wirelessly communicated, where no data is purposefully wirelessly communicated during this time period. The time period may be an inter-frame space (IFS) period within which no data is to be wirelessly communicated, and that is a period waited for prior to accessing a wireless medium over which data is wirelessly communicated. One or more actions are performed to counteract the noise. The frequency at which a liquid crystal display is being driven may be decreased so that harmonics caused thereby that caused the noise are no longer within the wireless communication frequency range. An opposite-in-phase version of the noise may also or alternatively be combined with a signal when data is subsequently wirelessly received. The signal includes a data component and a noise component, the opposite-in-phase version of the noise canceling out the noise component.

9 Claims, 7 Drawing Sheets

(56) References Cited

U.S. PATENT DOCUMENTS

| | | | |
|---|---|---|---|
| 7,197,329 B2* | 3/2007 | Ezumi | 455/550.1 |
| 7,209,767 B2* | 4/2007 | Usui | 455/556.1 |
| 2004/0171352 A1* | 9/2004 | Maeda et al. | 455/67.13 |
| 2006/0217062 A1* | 9/2006 | Saffre et al. | 455/11.1 |

FOREIGN PATENT DOCUMENTS

| | | |
|---|---|---|
| JP | 08-166889 | 6/1996 |
| JP | 2004-127269 | 4/2004 |
| JP | 2004-129321 | 4/2004 |

OTHER PUBLICATIONS

Marcelo M. Carvalho et a., Delay Analysis of IEEE 802.11 in Single-Hop Networks, IEEE International Conference on Network Protocols, Atlanta, Georgia, Nov. 2003.

* cited by examiner

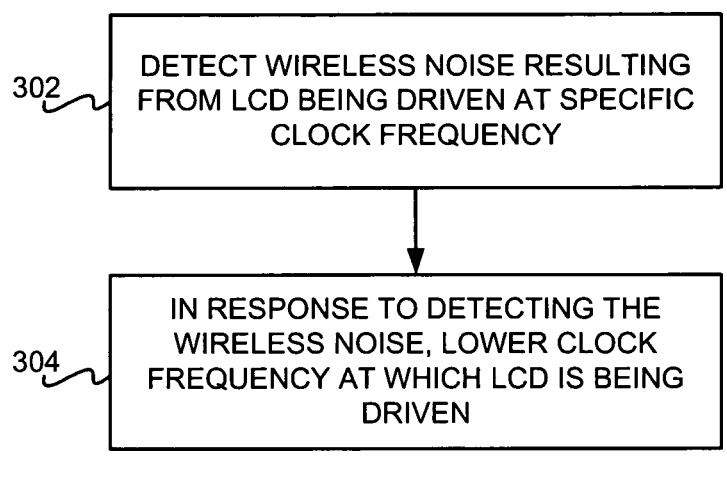
FIG 3
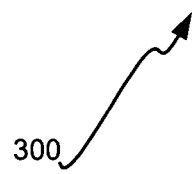

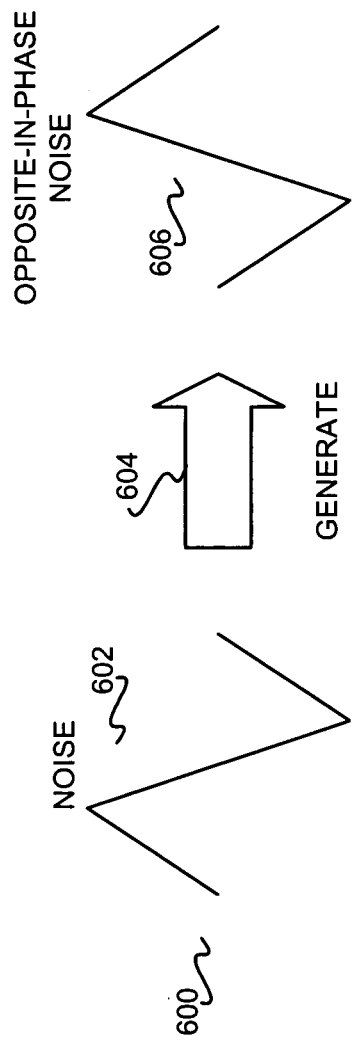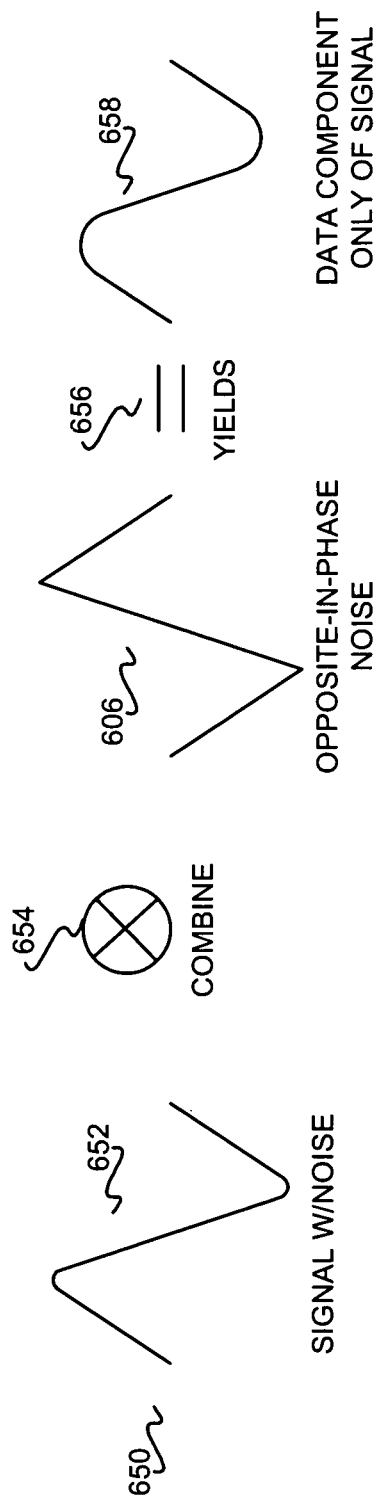

DETECTING WIRELESS NOISE WITHIN TIME PERIOD IN WHICH NO DATA IS PURPOSEFULLY WIRELESSLY COMMUNICATED

FIELD OF THE INVENTION

The present invention relates generally to wireless communication of data, and more particularly to detecting wireless noise that can impede the wireless communication of data.

BACKGROUND OF THE INVENTION

Traditionally computing devices have been networked with one another via wired connections. While networking computing devices affords users substantial benefits, running network cables to each computing device can be difficult to accomplish. Therefore, more recently wireless networking has become popular. Wireless networking allows computing devices to communicate with one another via radio frequency (RF) waves. No network cables have to be run to the computing devices.

Some of the more popular wireless networking protocols are IEEE 802.11b, commonly referred to as Wi-Fi, IEEE 802.11g, and IEEE 802.11a. Whereas the 802.11b and the 802.11g protocols provide for the communication of data at a frequency of 2.4 gigahertz (GHz) band or 2.4-2.5 GHz, the 802.11a protocol provides for the communication of data at a frequency of 5.0 GHz band, or 5.0-6.0 GHz. Differences in how the protocols operate allow them to provide wireless data communication at different speeds. For instance, the currently most popular 802.11b protocol achieves data rates of up to 11 megabits per second (mbps), whereas the 802.11g and 802.11a protocols can achieve data rates of up to 54 mbps.

A difficulty with all types of wireless communication is that they are susceptible in varying degrees to wireless noise. Wireless noise is generally and non-restrictively defined as undesired signals occurring on the same frequency over which data is being communicated. The wireless noise may not represent any type of data at all; for example, microwave ovens commonly emit radiation at the same frequency of 2.4 GHz at which the 802.11b and the 802.11g protocols communicate. Liquid crystal display (LCD) monitors can also emit wireless noise at harmonics inclusive of the 2.4 GHz frequency, affecting wireless data communication. The wireless noise may alternatively represent data being communicated in accordance with a different communication scheme than a desired protocol. For instance, computing devices wirelessly communicating in accordance with the 802.11b or the 802.11g protocol may have to vie for the 2.4 GHz frequency space in competition with cordless phones that commonly communicative over the 2.4 GHz frequency, too.

The 802.11a, 802.11b, and 802.11g protocols, among other wireless data protocols, have built-in safeguards to ensure that data is still wirelessly communicated in the face of all but the most severe wireless noise. Different strategies are used to counteract wireless noise. First, each data packet sent wirelessly has to be acknowledged by the receiving device. If the sending device does not receive the acknowledgment from the receiving device, it considers the data packet in question "dropped," and resends the data packet. Second, the rates at which data is wireless communicated can be lowered as a response strategy to wireless noise. For instance, the 802.11b protocol allows computing devices to lower the transmission rate from the maximum 11 mbps to a slower, but more noise-tolerant, 5.5 mbps, or to even lower transmission rates.

These and other strategies for handling wireless noise are disadvantageous, however, because they reduce wireless throughput, or performance, slowing down the entire wireless network. In the former case, for instance, having to resend dropped packets reduces the total number of data packets sent within a given time period. In the latter case, the decrease in throughput is more explicit, in which the transmission rate is lowered from the maximum rate to a lower rate that is more tolerant of noise. For these and other reasons, then, there is a need for the present invention.

SUMMARY OF THE INVENTION

The present invention relates generally to detecting wireless noise within a time period in which no data is purposefully wirelessly communicated. A method of the invention thus first detects wireless noise within a time period specifically held after a data packet is wirelessly transmitted or wirelessly received, such that no data is purposefully wirelessly transmitted or wirelessly received during this time period. The time period may be an inter-frame space (IFS) period within which no data is to be wirelessly transmitted or wirelessly received. The IFS period is particularly a time period that is specifically waited for prior to accessing a wireless medium—e.g., a given radio frequency (RF)—over which data is to be wirelessly communicated.

The method performs one or more actions to counteract the wireless noise in response to detecting the wireless noise. In one embodiment, the data may be wirelessly communicated using an antenna that is proximate to a liquid crystal display (LCD). The clock frequency at which the LCD is driven causes harmonics within a frequency range at which the data is being wirelessly communicated, such that driving the LCD causes the wireless noise. Therefore, in this embodiment the method decreases the clock frequency at which the LCD is being driven so that the harmonics caused thereby are no longer within the frequency range at which the data is being wirelessly communicated.

In another embodiment, an opposite-in-phase version of the wireless noise is generated, having a phase that is opposite to the phase of the wireless noise detected. When data is subsequently wirelessly received, the opposite-in-phase version of the wireless noise is combined with the wireless signal received. The wireless signal includes both a data component and a noise component, such that the opposite-in-phase version of the wireless noise being combined with the wireless signal at least substantially cancels out the noise component of the wireless signal. Thus, just the data component substantially remains within the wireless signal.

A computing device of the present invention includes an antenna, a wireless communication mechanism, and a wireless noise-reduction mechanism. The wireless communication mechanism is to wirelessly communicate data over the antenna. The wireless noise-reduction mechanism is to detect wireless noise within a time period specifically held after each data packet is wireless transmitted or wirelessly received by the wireless communication mechanism over the antenna. The time period is such that no data is purposefully wirelessly transmitted to wirelessly received during the time period. The wireless noise-reduction mechanism is further to perform one or more actions to counteract the wireless noise in response to detection thereof, such as one of the actions that have been described above.

An article of manufacture of the present invention includes a computer-readable medium, and means in the medium. The medium may be a recordable data storage medium, a modulated carrier signal, or another type of computer-readable medium. The means is for detecting wireless noise within a time period specifically held after a data packet is wirelessly transmitted or wirelessly received. The time period is an IFS period specified by a wireless communication protocol as a period of time in which no data is purposefully to be wirelessly transmitted or wirelessly received, and that is specifically waited for prior to accessing a wireless medium over which data is to be wirelessly communicated. The means is further for performing one or more actions to counteract the wireless noise, such as one of the actions that have been described above.

Embodiments of the invention provide for advantages over the prior art. First, wireless noise is uniquely detected within the time period specifically held after a data packet is wirelessly transmitted or wirelessly received. That the time period is "held" means that the time period is waited for, such that no data is, wirelessly communicated during this time period. The time period, in conjunction with IEEE 802.11b and 802.11g protocols, as well as other wireless protocols, may be the IFS period specified by such protocols as the period of time in which no data is purposefully to be wirelessly transmitted or wirelessly received, and that is specifically waited for prior to accessing the wireless medium—i.e., the RF of 2.4 GHz or another frequency—over which data is to be wirelessly communicated. That no data is "purposefully" to be wirelessly communicated during this time period means that the time period does not just result from a situation, for example, in which no data is desired to be communicated. Rather, there may still be data that is desired to be communicated, but nevertheless this time period is purposefully waited for, such that data is not sent during the period.

Second, one embodiment of the invention achieves the counteracting of wireless noise that is caused by the driving of an LCD display proximate to an antenna by lowering the clock frequency at which the LCD display is driven, such that harmonics of that frequency no longer are within the wireless frequency at which data is being communicated. Third, another embodiment of the invention achieves the counteracting of wireless noise by canceling out the wireless noise from a wireless signal with an opposite-in-phase version of the wireless noise, where it may be presumed that the wireless noise has substantially the same frequency profile over time. In either of these instances, wireless noise is handled not by simply reducing performance of the wireless data communication, as in the prior art, but rather by counteracting the noise. As a result, wireless data communication performance is likely to not be reduced as much as in the prior art, if at all. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method for detecting and counteracting wireless noise resulting from a liquid crystal display (LCD) being driven at a specific clock frequency, according to an embodiment of the invention.

FIGS. 6A and 6B are example scenarios illustratively depicting the generation and use of an opposite-in-phase version of wireless noise to counteract the wireless noise, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
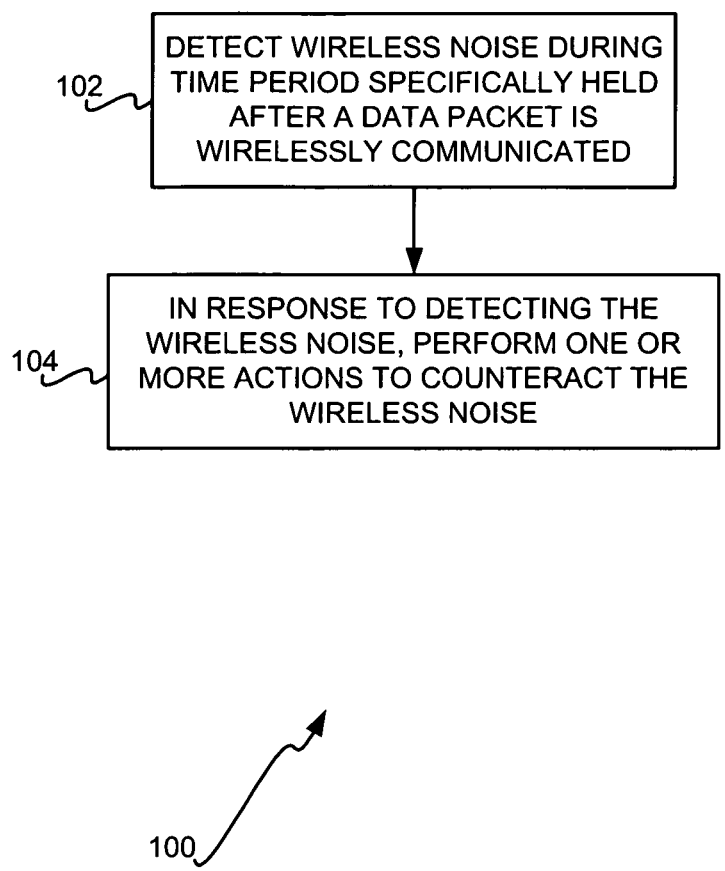
FIG. 1 is a flowchart of a method for detecting and counteracting wireless noise, according to a preferred and general embodiment of the invention, and is suggested for printing on the first page of the patent.

FIG. 1 shows a method 100 for detecting wireless noise and counteracting the wireless noise, according to an embodiment of the invention. The method 100 is specifically performed by a computing device that is to wirelessly communicate with one or more other computing devices. The wireless communication may include the wireless transmission and/or the wireless receipt of data. The wireless communication may be accomplished in accordance with a known wireless data protocol, such as the IEEE 802.11b, the IEEE 802.11a, and the 802.11g protocols, as known within the art.

Wireless noise is detected within a time period specifically held after a data packet is wirelessly transmitted or wirelessly received within a data frame (102). A data packet is a collection of data to be sent from one computing device to one or more other computing devices. A data frame is a period of time within which the data packet is so sent from one computing device to one or more other computing devices.

Wireless noise is generally and non-restrictively defined as undesired signals occurring on the same frequency over which data is being communicated. The wireless noise may not represent any type of data at all; for example, microwave ovens commonly emit radiation at the same frequency of 2.4 GHz at which the 802.11b and the 802.11g protocols communicate. Liquid crystal display (LCD) monitors can also emit wireless noise at harmonics inclusive of the 2.4 GHz frequency, affecting wireless data communication. The wireless noise may alternatively represent data being communicated in accordance with a different communication scheme than a desired protocol. For instance, computing devices wirelessly communicating in accordance with the 802.11b or the 802.11g protocol may have to vie for the 2.4 GHz frequency space in competition with cordless phones that commonly communicative over the 2.4 GHz frequency, too.

The time period in which wireless noise is detected is that in which no data packets are purposefully wirelessly communicated, as is described in more detail later in the detailed description. Specifically, the time period is "held" after data has been wirelessly communicated, meaning that the time period is waited for purposefully after the data has been wirelessly communicated. Furthermore, that the time period is waited for "purposefully" means that the time period does not just result from, for instance, the fact that no further data needs to be communicated, but rather that the time period is purposefully and deliberately waited for without transmission of data, even if there is further data to be sent.

In response to detecting the wireless noise, one or more actions to counteract the wireless noise are performed (104). Different embodiments of the invention are not limited in the action or actions that they perform to counteract the wireless noise. For instance, in one embodiment, as is described in more detail later in the detailed description, the driving frequency of a liquid crystal display (LCD) is reduced to prevent harmonics of this frequency from causing the wireless noise. As another example, in another embodiment, as is also described in more detail later in the detailed description, an opposite-in-phase version of the wireless noise is combined with a wireless signal to cancel out the wireless noise from the signal.

Figure 2:
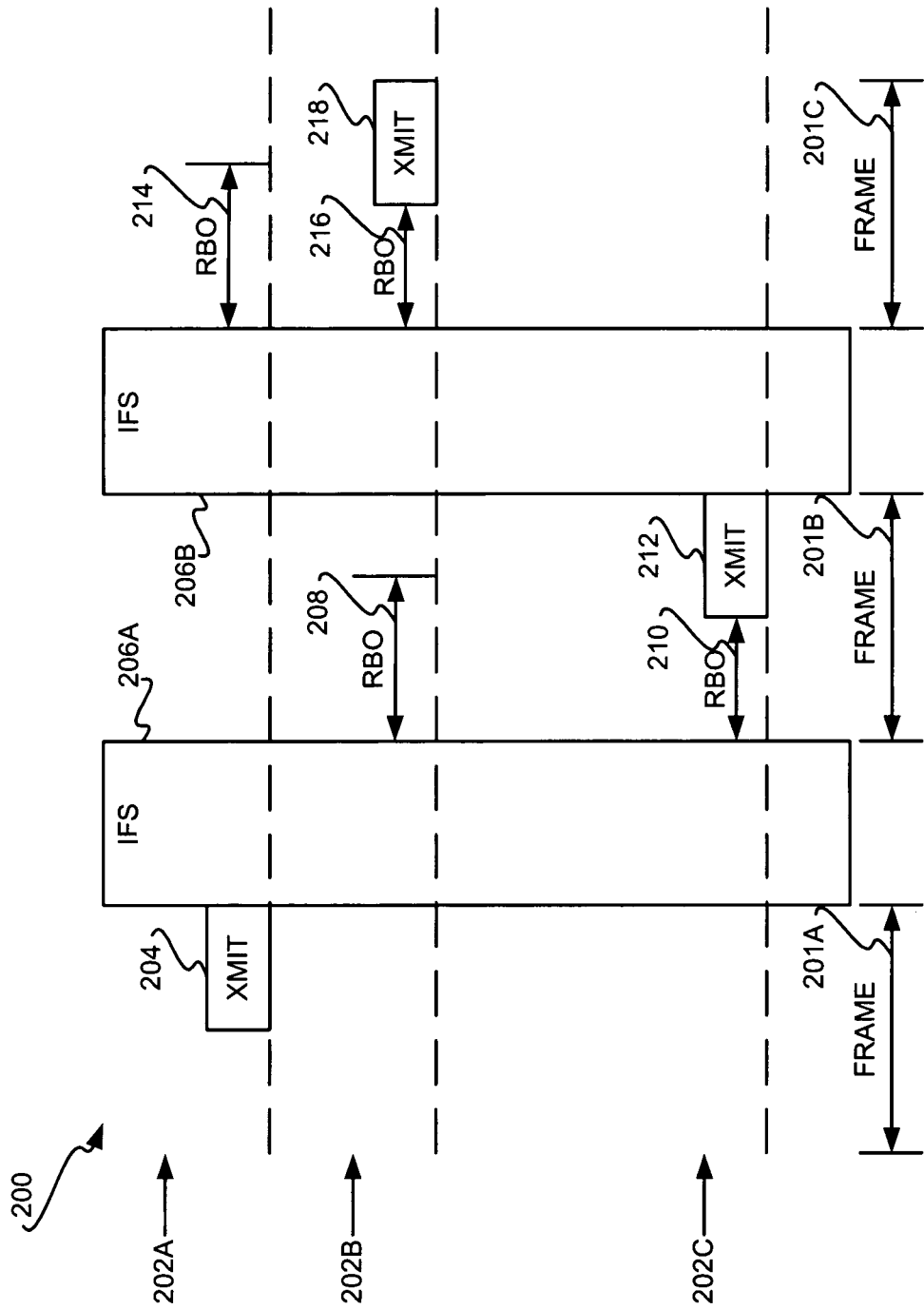
FIG. 2 is a diagram depicting the manner by which data is wirelessly communicated, in which there are inter-frame spaces (IFS's) between frames of data being so wirelessly communicated, such that wireless noise is detected during these IFS's, according to an embodiment of the invention.

FIG. 2 shows an example scenario 200 depicting how wireless communication results in time periods held after data packets are transmitted, such that wireless noise can be detected during these time periods, according to an embodiment of the invention. The example scenario 200 includes communications from three different computing devices 202A, 202B, and 202C, which are collectively referred to as the computing devices 202. In a first data frame 201A, for sake of example, the first computing device 202A transmits a data packet 204, which is received, sensed, or detected by the other computing devices 202B and 202C.

Next, all of the computing devices 202 wait for at least a period of time referred to as an inter-frame space (IFS) 206A. The IFS 206A is a period of time dictated by the wireless communication protocol being used, in which all of the computing devices 202 are to not send any data. For instance, the protocol may be an orthogonal frequency division multiplexing (OFDM) protocol, like the 802.11g protocol, which defines one or more IFS periods. The IFS 206A may be a short inter-frame space (SIFS), a point coordination function (PCF) inter-frame space (PIFS), a distributed coordination function (DCF) inter-frame space (DIFS), or another type of IFS, as can be appreciated by those of ordinary skill within the art.

After the IFS 206A has elapsed, for sake of example, it is presumed that both the computing devices 202B and 202C desire to send data. Each of the computing devices 202B and 202C wait for a randomly determined length of time, referred to as a random backoff (RBO) period. The computing device that ends up waiting for a shorter RBO period begins to transmit data, where this data is detected by the other computing device waiting for the longer RBO period. Thus, the other computing device waiting for the longer RBO period concludes that it has "lost" the race to gain control of the wireless medium—viz., the wireless frequency over which data is communicated—and does not transmit its desired data, but rather waits until the next data frame.

Therefore, as depicted in the example scenario 200 of FIG. 2, the RBO period 208 of the computing device 202B is longer than the RBO period 210 of the computing device 210 at the beginning of the data frame 201B. The computing device 202C begins to transmit its data packet 212 after its RBO period 210 concludes. When the RBO period 208 of the computing device 202B concludes, the computing device 202B recognizes that the computing device 202C has already begun to transmits its data packet 212, and does not transmit any data of its own.

After the data frame 201B, all of the computing devices 202 wait again for at least a period of time referred to as the IFS 206B, where the IFS 206A and the IFS 206B are collectively referred to as the IFS's 206. During the IFS 206B, no data is purposefully transmitted by any of the computing devices 202. After the IFS 206B has elapsed, for sake of example, it is presumed that both the computing devices 202A and 202B desire to send data. However, the RBO period 214 generated by the computing device 202A is longer than the RBO period 216 generated by the computing device 202B. Therefore, the computing-device 202B "wins," and sends its data packet 218 during the data frame 201C. The data frames 201A, 201B, and 201C are themselves collectively referred to as the data frames 201.

Thus, in the scenario 200 of FIG. 2, the IFS's 206 are interspersed among the data frames 201. During the IFS's 206, the computing devices 202 purposefully do not send any data. That is, the IFS's 206 are time periods that are specifically held by the computing devices 202 for no data communication, in-between the data frames 201. Therefore, the computing devices 202 can each conclude that any signals detected on the radio frequency (RF) over which data communication is to be accomplished, during the IFS's 206, do not represent actual data of real data packets being transmitted by other of the computing devices 202. Rather, the computing devices 202 can conclude that any signals detected on the RF during the IFS's 206 are wireless noise. Thus, the computing devices 202 detect wireless noise during the IFS's 206.

FIG. 3 shows a method 300 for detecting and counteracting wireless noise resulting from the clock frequency at which an LCD is being driven, according to an embodiment of the invention. By way of explanation, an LCD is driven, or refreshed, at a particular clock frequency, such as 65 Hz. However, this clock frequency may result in harmonics within the frequency range at which data is being wirelessly communicated. These harmonics are or result in wireless noise. This problem is particularly acute where the antenna used for wireless communication is located proximate to the LCD. For example, in many laptop or other portable computers, the antenna is located internal to the bezel or housing within which the LCD is itself located.

The method 300 thus detects wireless noise that results from the LCD being driven at a particular or specific clock frequency (302). In response, the method 300 lowers the clock frequency at which the LCD is driven (304), such as to less than 60 Hz, to 55 Hz, and so on. Lowering the clock frequency results in the harmonics of this frequency to fall outside of the frequency range at which data is being wirelessly communicated. Therefore, the harmonics no longer are or cause wireless noise within this frequency range.

In one embodiment, the wireless noise resulting from the LCD being driven at a specific clock frequency is detected by determining whether the wireless signal detected during an IFS is greater than a predetermined threshold in magnitude or amplitude. As has been noted, because no data is wirelessly communicated during the IFS, it can be presumed that any wireless signal detected during the IFS is in fact wireless noise. Therefore, in this embodiment, if the wireless noise is greater than a predetermined threshold, then it is concluded that the LCD being driven at a specific clock frequency is causing the wireless noise.

In another embodiment, the harmonics resulting from the LCD being driven at a specific clock frequency and that cause or are the wireless noise may be recognized as having a particular profile or signature in either the time or frequency domain. Thus, the wireless signal detected during an IFS can be compared against a stored profile or signature of wireless noise that results from the LCD being driven at a specific clock frequency. If there is a match, or correspondence by more than a predetermined threshold, then it can be concluded that the wireless signal detected during the IFS represents wireless noise resulting from the LCD being driven at a specific frequency.

In still another embodiment, the wireless noise resulting from the LCD being driven at a specific clock frequency is detected as follows. If the wireless signal detected during an IFS—i.e., wireless noise—is greater than a predetermined threshold in magnitude or amplitude, then the clock frequency at which the LCD is driven is lowered, as before. During the next IFS, it is determined whether the wireless noise has been substantially lowered, such as below that predetermined threshold. If so, then it can be concluded that the wireless noise is substantial part resulted from the LCD being driven at a specific frequency, such that lowering of the frequency has substantially eliminated the wireless noise. If the wireless noise has not been substantially lowered, however, then it can be concluded that the LCD being driven at a specific frequency did not cause the wireless noise, such that the LCD can again be driven at this frequency.

Figure 4:
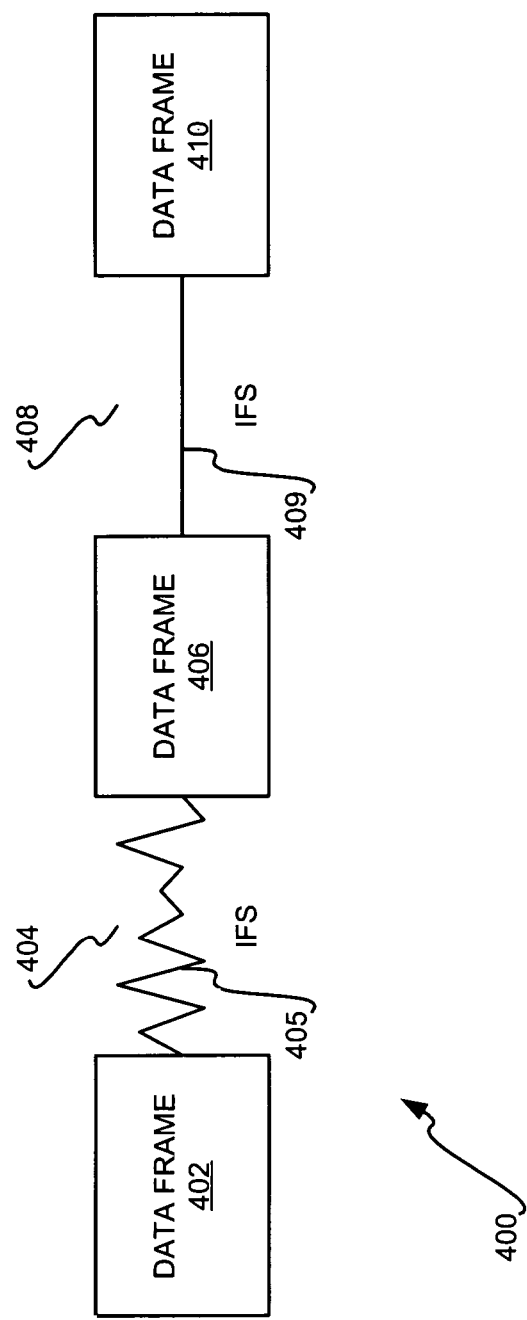
FIG. 4 is a diagram depicting how lowering the clock frequency at which an LCD is driven can reduce wireless noise, according to an embodiment of the invention.

FIG. 4 shows an example scenario 400 depicting how wireless noise resulting from the LCD being driven at a specific clock frequency can be detected during an IFS, according to an embodiment of the invention. First, during a data frame 402 a data packet is transmitted. Thereafter, during the IFS 404, no data is transmitted, as has been described. Thus, the wireless signal 405 that is detected within the frequency range at which wireless data communication occurs is concluded to be wireless noise. In one embodiment, if this wireless noise is greater than a predetermined threshold, then the frequency at which the LCD is driven is lowered. In another embodiment, if the wireless noise has a profile or signature matching a previously stored profile or signature of representative noise that results from the LCD being driven at a specific clock frequency, or corresponds to this stored profile or signature by more than a threshold, then it is concluded that the wireless noise is indeed caused by the LCD being driven at the frequency in question, such that the frequency is lowered.

During another data frame 406, another data packet is transmitted. During the next IFS 408, no data is transmitted, as has been described. In the example scenario 400 of FIG. 4, it is depicted that the wireless signal 409, which represents wireless noise since no data is transmitted during the IFS 408, has substantially decreased in magnitude or amplitude as compared to the wireless signal 405. Therefore, in another embodiment, it can be concluded that the clock frequency at which the LCD is driven did indeed cause the wireless noise, such that lowering of this clock frequency resulted in a substantial decrease or abatement of the wireless noise detected from the wireless signal 405 to the wireless signal 409. Finally, after the IFS 408, the data frame 410 results, in which a data packet is again transmitted.

Figure 5:
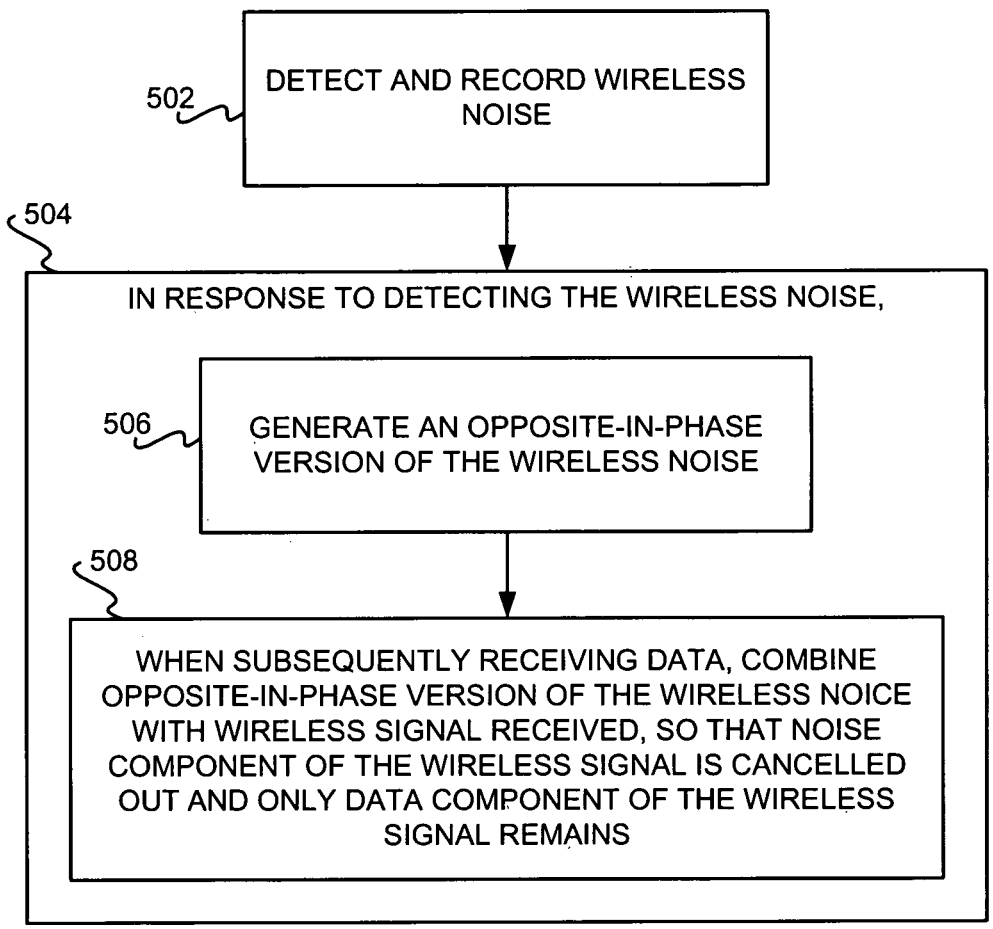
FIG. 5 is a flowchart of a method for detecting and counteracting wireless noise by generating and using an opposite-in-phase version of the wireless noise, according to an embodiment of the invention.

FIG. 5 shows a method 500 for detecting and counteracting wireless noise, according to another embodiment of the invention. The method 500 presumes that the wireless noise is substantially regular or repetitive in nature, in that the noise that occurs during an IFS or other time period in which no data is wirelessly communicated will reoccur in substantially similar or identical form during a data frame in which data is indeed wirelessly communicated. It is noted that the method 500 may be performed in conjunction with or separately from the method 300 of FIG. 3. That is, both the method 500 of FIG. 5 and the method 300 of FIG. 3 are complementary ways of implementing the method 100 of FIG. 1, and can be performed either separately or together.

First, the wireless noise is detected and recorded or stored, during an IFS or other time period in which no data is purposefully wireless communicated (502). Next, in response to detecting the wireless noise (504), an opposite-in-phase version of the wireless noise is generated from the wireless noise that has been recorded or stored (506). Thereafter, when data is wirelessly received during a data frame, the opposite-in-phase version of the wireless noise is combined with the wireless signal received during this data frame (508). The wireless signal has a data component, representing the actual data transmitted by a computing device and received by the computing device performing the method 500, and a noise component, which is presumed to be substantially similar or identical to the wireless noise detected and recorded or stored during the IFS. Combining the opposite-in-phase version of the wireless noise with the wireless signal thus at least substantially cancels out the noise component of the signal. All that remains is the desired data component of the wireless signal, representing the data that was transmitted during this data frame.

FIGS. 6A and 6B illustratively depict performance of the method 500, according to an embodiment of the invention. In FIG. 6A, an example scenario 600 depicts wireless noise 602 detected and stored or recorded during an IFS or other time period in which no data is purposefully communicated. That is, a wireless signal is received that has a waveform that is the wireless noise 602, since it is presumed that any wireless signal receiving during the IFS is wireless noise. The wireless noise 602 is represented as a simple saw-tooth or triangular waveform in FIG. 6A for illustrative clarity and simplicity, and descriptive convenience, and in actuality the wireless noise 602 will not have as simple of a waveform as that shown in FIG. 6A.

Next, as indicated by the reference number 604, an opposite-in-phase version 606 of the wireless noise 602 is generated, and stored or recorded. The opposite-in-phase version 606 of the wireless noise 602 has a phase that is opposite to that of the wireless noise 602, as can be appreciated by those of ordinary skill within the art. Thus, whereas the wireless noise 602 has a positive peak followed by a negative peak in the example scenario 600 of FIG. 6A, the opposite-in-phase version 606 has a negative peak followed by a positive peak. In general, the opposite-in-phase version 606 of the wireless noise 602 is generated by shifting the phase of the wireless noise 602 by 180 degrees, as can be appreciated by those of ordinary skill within the art.

In FIG. 6B, an example scenario 650 depicts a wireless signal 652 being received that includes a data component 658 and a noise component as the noise 602. For illustrative clarity and simplicity, and descriptive convenience, in other words, it is assumed that the noise component of the wireless signal 652 is identical to the wireless noise 602 previously detected and recorded. However, in actuality the noise component of the wireless signal 652 may vary to some extent from the wireless noise 602. The closeness of the noise component of the wireless signal 652 to the wireless noise 602 previously detected and recorded will determine the extent to which the noise component of the wireless signal 652 can be successfully removed from the wireless signal 652.

The wireless signal 652 is received in a data frame after the IFS in which the wireless noise 602 was received in FIG. 6A. This is why the wireless signal 652 contains both a data component and a noise component. The data component is present within the wireless signal 652 because data is sent during the data frame. The noise component is present within the wireless signal 652 because the wireless noise 602 remains detectable within the frequency range over which data is being wirelessly communicated.

Still referring to FIG. 6B, as indicated by the reference number 654, the opposite-in-phase version 606 of the wireless noise 602 is combined with the wireless signal 652. Such combination can be performed in the time domain or in the frequency domain, and in one embodiment may by accomplished by digital signal processing (DSP), including Fast Fourier Transform (FFT) and other types of frequency domain processing. Such combination may also be referred to as mixing the opposite-in-phase version 606 of the wireless noise 602 with the wireless signal 652. As indicated by the reference number 656, this combination results or yields in only the data component 658 remaining present in the wireless signal 652. This is because the opposite-in-phase version 606 of the wireless noise 602 cancels out the noise component of the wireless signal 652 that includes both the noise component and the data component 658. Therefore, only the data component 658 remains in the wireless signal 652.

Figure 7:
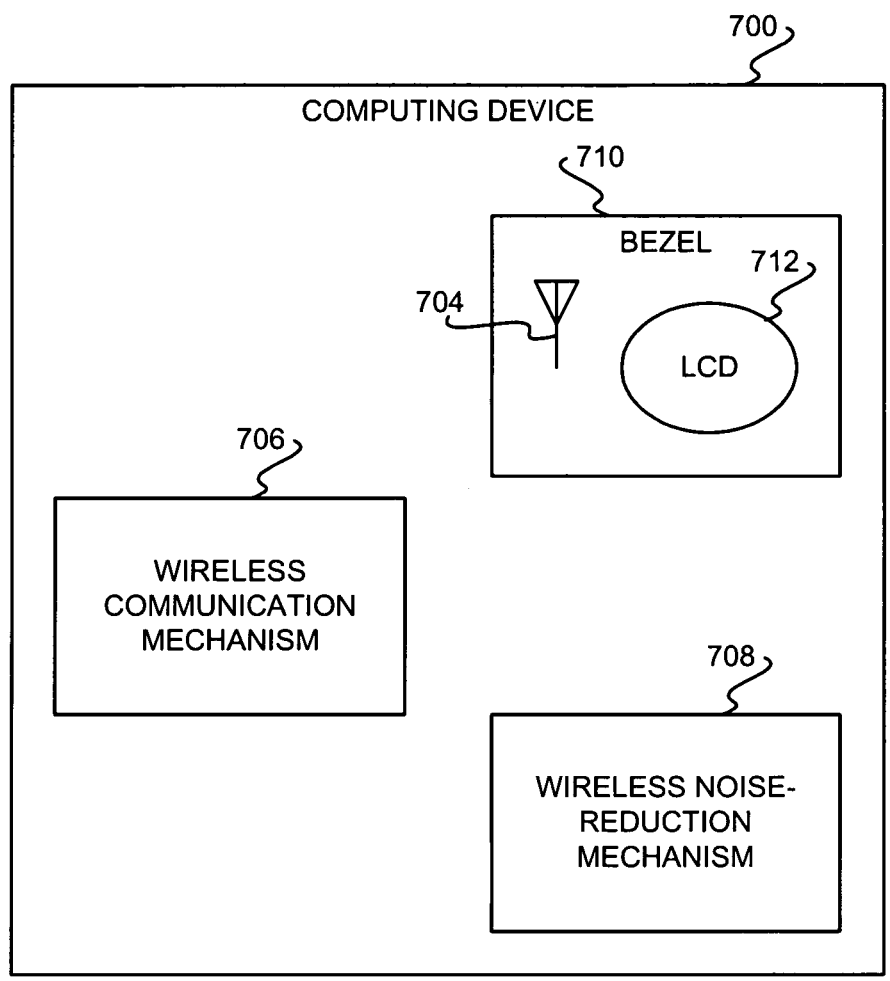
FIG. 7 is a diagram of a rudimentary computing device in which wireless noise is counteracted during wireless data communication, according to an embodiment of the invention.

FIG. 7 shows a rudimentary computing device 700, according to an embodiment of the invention. The computing device 700 includes at least an antenna 704, a wireless communication mechanism 706, and a wireless noise-reduction mechanism 708. The mechanisms 706 and 708 may each be hardware, software, or a combination of hardware and software. As specifically depicted in FIG. 7, the computing device 700 optionally includes a bezel 710 within which an LCD 712 is disposed or situated, and within which the antenna 704 is disposed or situated. As such, the computing device 700 may be a portable computing device, like a laptop or a notebook computer, a personal digital assistant (PDA) device, a mobile or cellular phone device, and so on. However, the computing device 700 may alternatively be a desktop computer, or a peripheral computer device, like a wireless bridge device, an access point device, and so on, as can be appreciated by those of ordinary skill within the art.

The wireless communication-mechanism 706 wireless communicates data over the antenna 704. That is, the mechanism 706 is able to wirelessly receive and/or wirelessly transmit data over the antenna 704. The wireless noise-reduction mechanism 708 is to detect noise within a time period specifically held after each of a number of packets of data are wirelessly communicated by the wireless communication mechanism 706. The data packets are wirelessly communicated during data frames, where the mechanism 708 is to detect noise during time periods, such as IFS's, in which no data is purposefully wirelessly transmitted or received, as has been described. The wireless noise-reduction mechanism 708 is further to perform one or more actions to counteract the wireless noise in response to detecting the wireless noise.

For instance, in the embodiment of the invention in which the LCD 712 is disposed within the bezel 710 in which the antenna 704 is also disposed, the LCD 712 may be driven at a clock frequency that causes harmonics within a frequency range at which the data is being wirelessly communicated. Thus, as has been described in relation to FIGS. 3 and 4, driving of the LCD 712 at this clock frequency causes wireless noise. The wireless noise-reduction mechanism 708 detects this wireless noise, and in response decreases the clock frequency at which the LCD is driven so that the harmonics caused thereby no longer are within the frequency range at which data is being wirelessly communicated. As a result, the wireless noise is substantially reduced or diminished.

As another example, in another embodiment of the invention, the wireless noise-reduction mechanism 708 may also or alternatively record the wireless noise detected and generate an opposite-in-phase version of the wireless noise. Thereafter, the wireless communication mechanism 706 combines this opposite-in-phase version of the wireless noise with a wireless signal received over the antenna 704. Combining the opposite-in-phase version of the wireless noise at least substantially cancels out the noise component of the wireless signal, so that just a data component of the signal substantially remains, as has been described in relation to FIGS. 5, 6A, and 6B.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   driving a liquid crystal display (LCD) at a first driving frequency;
   transmitting data at a data frequency within a first data frame of a plurality of data frames specified by a communication protocol;
   stopping transmission of the data when the first data frame has finished even though additional data is to be transmitted;
   before a second data frame of the plurality of data frames has started, detecting whether wireless noise is present at the data frequency, within an inter-data frame period specified by the communication protocol;
   in response to detecting that the wireless noise is present at the data frequency, driving the LCD at a second driving frequency lower than the first driving frequency;
   transmitting the additional data at the data frequency within the second data frame;
   stopping transmission of the data when the second data frame has finished;
   before a third data frame of the plurality of data frames has started detecting whether the wireless noise is still present at the data frequency, within another inter-data frame period specified by the communication protocol;
   in response to detecting that the wireless noise is no longer present at the data frequency, continuing to drive the LCD at the second driving frequency; and
   in response to detecting that the wireless noise is still present at the data frequency, again driving the LCD at the first driving frequency.

2. The method of claim 1, wherein the protocol is an orthogonal frequency division multiplexing (OFDM) protocol defining one or more inter-frame space (IFS) periods.

3. The method of claim 2, wherein the OFDM protocol is part of the IEEE 802.11g protocol.

4. The method of claim 1, wherein data is wirelessly communicated using an antenna that is proximate to the LCD, such that a clock frequency at which the LCD is being driven causes harmonics within a frequency range at which the data is being wirelessly communicated, such that driving of the LCD causes the wireless noise.

5. The method of claim 4, wherein detecting the wireless noise comprises determining that a level of the wireless noise exceeds a predetermined threshold.

6. The method of claim 1, wherein detecting the wireless noise comprises recording the wireless noise.

7. A computing device comprising:
a liquid crystal display (LCD);
an antenna;
a wireless communication mechanism to wirelessly communicate data over the antenna; and,
a wireless noise-reduction mechanism to:
drive the LCD at a first driving frequency;
transmit data at a data frequency within a first data frame of a plurality of data frames specified by a communication protocol;
stop transmission of the data when the first data frame has finished even though additional data is to be transmitted;
before a second data frame of the plurality of data frames has started, detect whether wireless noise is present at the data frequency, within an inter-data frame period specified by the communication protocol;
in response to detecting that the wireless noise is present at the data frequency, drive the LCD at a second driving frequency lower than the first driving frequency;
transmit the additional data at the data frequency within the second data frame;
stop transmission of the data when the second data frame has finished;
before a third data frame of the plurality of data frames has started, detect whether the wireless noise is still present at the data frequency, within another inter-data frame period specified by the communication protocol;
in response to detecting that the wireless noise is no longer present at the data frequency, continue to drive the LCD at the second driving frequency; and
in response to detecting that the wireless noise is still present at the data frequency, again drive the LCD at the first driving frequency.

8. The computing device of claim 7, further comprising a bezel within which the LCD is disposed and within which the antenna is disposed,
wherein the LCD is driven at a frequency that causes harmonics within a frequency range at which the data is being wirelessly communicated, such that driving of the LCD causes the wireless noise.

9. The computing device of claim 8, wherein the wireless noise-reduction mechanism is to detect the wireless noise as exceeding a predetermined threshold.

* * * * *